June 1, 1965     J. W. COSBY ETAL     3,187,089
CARBONIZED JOINT BETWEEN CARBON ELECTRODES
Filed June 21, 1962
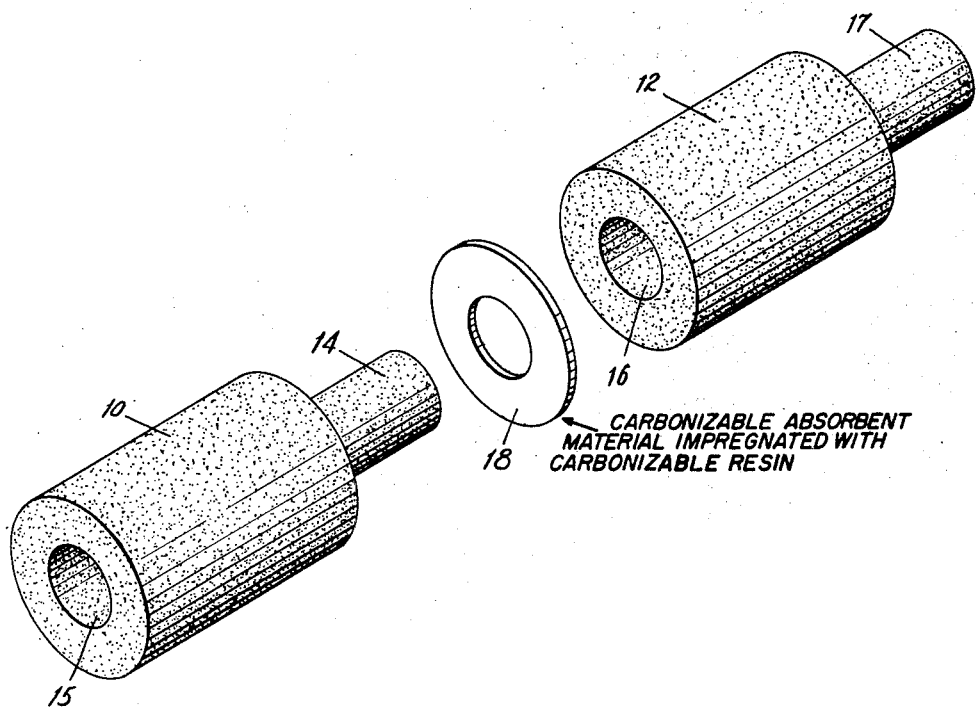
INVENTORS
JOHN W. COSBY
MARVIN R. RIEK
WILBUR R. LAUZAU
ATTORNEY

United States Patent Office 3,187,089
Patented June 1, 1965

3,187,089
CARBONIZED JOINT BETWEEN CARBON
ELECTRODES
John W. Cosby, White Plains, N.Y., and Wilbur R.
Lauzau and Marvin R. Rick, Fostoria, Ohio, assignors
to Union Carbide Corporation, a corporation of New
York
Filed June 21, 1962, Ser. No. 204,266
4 Claims. (Cl. 174—94)

The invention concerns a means by which carbon electrodes can be joined end-to-end, and particularly refers to a resinous washer suitable for joining carbon electrodes having mutually engaging protrusions and recesses.

Carbon electrodes are widely used for producing electrical arcs in arc lamps. Since the carbon electrodes must be held by jaws or other mechanical means to form an arc zone, there is a limit on the length of each electrode which may be used. The unused stubs represent a significant amount of the cost of an electrode; therefore, a method or means by which they can be used is desirable.

Another problem is that the operation of the lamp or other apparatus must be discontinued while the stubs are removed and new electrodes are put in place. A method or means by which the electrodes can be continuously fed into the arc without interruption is also obviously desirable.

The principal object of the invention, therefore, is to provide a means as well as a method by which arc carbon stubs can be conveniently used and by which continuous arc operation can be effected.

The object of the invention is achieved by a washer comprising an annular piece of absorbent material, such as paper, and a carbonizable resin impregnated in the absorbent material. This washer, when used in conjunction with arc lamp carbon electrodes each having a protrusion one one end and a recess for accepting a protrusion of another electrode on the other end, is placed over the protrusion before engaging two adjacent electrodes, and the washer is then carbonized to effect a strong carbonaceous bond between the two joined electrodes, or between an electrode and an electrode stub, as the case may be.

An exploded view of two electrodes joined by means of the invention is shown in the drawing.

With reference to the drawing, the exploded view there shown of two joined electrodes 10 and 12 illustrates how electrodes may be conveniently joined together in accordance with the invention. One electrode 10 has a protrusion 14 which fits into a recess 16 in the other electrode 12. On the opposite ends of these electrodes 10 and 12 are a recess 15 and a protrusion 17, respectively, so that each electrode has a protrusion on one end and a recess in the other. This electrode construction is the construction preferred for use in accordance with the practice of the invention.

The washer 18 fits over the protrusion 14 and between the electrodes 10 and 12 when joined. This washer 18 comprises an annular piece of absorbent material impregnated with a carbonizable resin. The preferred construction comprises an annular piece of cellulosic material, such as paper toweling, impregnated with a thermosetting resin made from a phenol-aldehyde resin. Particularly suitable is a resin comprising a novolak in intimate admixture with a hardening amount of hexamethylenetetramine, e.g., about 9 parts of the tetramine per 100 parts of novolak by weight. Suitable novolaks can be made from about 100 parts phenol and about 75 parts formalin with a small addition of hydrochloric acid as catalyst. In general, the carbonizable resin is preferably chosen from the thermosetting resins which polymerize rapidly and which carbonize to form a strong bond.

When the two electrodes 10 and 12 are mutually engaged with the washer 18 in place between the two, a strong bond may be formed between the electrodes 10 and 12 by heating the joint to about 400° C. and preferably above about 500° C. to carbonize the resin in the washer 18. Ordinarily, the absorbent material in the washer 18 will also carbonize under these conditions. A strong and electrically conductive carbonaceous bond is effected in this manner. A ceramic baking tube or other radiant heating device will suffice for carbonizing the joint, and the heating time preferably lasts for 2 to 2.5 minutes. Furthermore, the heat from the arc can be used to carbonize the joint as the electrodes are fed into the arc. In such as case, however, the electrodes must be so positioned that they will not part before carbonization.

The heating device can be disposed in such a position near the arc that electrodes can be continually added to the stubs in the arc, thereby effecting continuous operation. If it is not in such a position, the electrode stubs after removal from the arc apparatus may be saved by joining them to a new electrode before its insertion in the arc apparatus.

The preferred method of making the washer of the invention comprises impregnating a piece of paper toweling with a 30–40 percent by weight solution of the phenol-formaldehyde resin above-described in acetone or methyl ethyl ketone. Any solvent which will dissolve the resin and then evaporate after impregnation will suffice, and the concentration of the resin in solution is not critical. Concentrations of about 20 to 50 percent, however, have proven most satisfactory.

After the paper is impregnated, the composite of paper and resin is allowed to dry, and the washers are then cut from the piece of paper by punching or other suitable means. Obviously, the paper may be formed into an annular piece before impregnation but the above method is preferred since easier handling results.

Electrodes permanently joined in accordance with the invention to form a carbon current conductor assembly are easily inserted in an arc device, and also burn evenly through the joint without loss of the arc. In addition, the washer of the invention provides a carbonizable resin at the area of the joint which resists breakage of the joint better than cement disposed on the protrusion itself. Furthermore, since the washer provides resin at the proper place in the joint, the total amount of resin necessary for a strong joint is reduced, and as a result less resin exudes from the joint. Exuded resin tends to gum the surrounding equipment, including the baking unit and the jaws holding the electrodes in arc position. The absorbent material in the washer of the invention provides a structural base which permits handling of the washer without breakage prior to carbonization.

Electrodes joined in accordance with the invention have been successfully tested in a blown arc lamp, and the advantages indicated above for the washer of the invention were exhibited. It should be manifest that the washer can be conveniently packaged, shipped, and used when needed.

What is claimed is:

1. An assembly of carbon electrodes suitable for use in an arc lamp, said assembly comprising a first carbon electrode having a recess in one end, a second carbon electrode having a protrusion on one end fitted against said first carbon electrode with said protrusion fitting in said recess, and a carbonized joint holding said first and second electrodes together, said joint being formed by the carbonization of a carbonizable washer disposed over said protrusion between said first and second electrodes, said washer comprising prior to carbonization an annular piece of carbonizable absorbent material and a carbonizable resin impregnated in said piece.

2. The assembly defined in claim 1 wherein said absorbent material is a cellulosic material.

3. The assembly defined in claim 1 wherein said absorbent material is paper.

4. The assembly defined in claim 3 wherein said resin is a thermosetting phenol-formaldehyde resin.

References Cited by the Examiner

UNITED STATES PATENTS

| | | | |
|---|---|---|---|
| 1,213,051 | 1/17 | Wickes | 18—59 |
| 1,785,587 | 12/30 | Kuhlmann. | |
| 2,657,326 | 10/53 | McCarty. | |
| 2,836,806 | 5/58 | Stroup | 174—94 X |
| 2,957,716 | 10/60 | Kaufmann et al. | 287—127 |
| 3,072,558 | 1/63 | Myers et al. | 204—280 |

E. JAMES SAX, *Primary Examiner.*

JOHN P. WILDMAN, DARRELL L. CLAY, *Examiners.*